United States Patent
Tamaki et al.

(10) Patent No.: US 9,797,605 B2
(45) Date of Patent: Oct. 24, 2017

(54) HEAT PUMP SYSTEM

(71) Applicants: Shogo Tamaki, Tokyo (JP); Ryo Oya, Tokyo (JP)

(72) Inventors: Shogo Tamaki, Tokyo (JP); Ryo Oya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 209 days.

(21) Appl. No.: 14/653,925

(22) PCT Filed: Jan. 7, 2013

(86) PCT No.: PCT/JP2013/050023
§ 371 (c)(1),
(2) Date: Jun. 19, 2015

(87) PCT Pub. No.: WO2014/106895
PCT Pub. Date: Jul. 10, 2014

(65) Prior Publication Data
US 2015/0330675 A1 Nov. 19, 2015

(51) Int. Cl.
F24D 17/02 (2006.01)
F25B 13/00 (2006.01)
F24D 5/12 (2006.01)
F24D 19/10 (2006.01)
F25B 29/00 (2006.01)

(52) U.S. Cl.
CPC ............... *F24D 17/02* (2013.01); *F24D 5/12* (2013.01); *F24D 19/1054* (2013.01);
(Continued)

(58) Field of Classification Search
CPC ........ F24D 17/02; F24D 19/1087; F24D 5/12; F24D 19/1054; F25B 29/003; F25B 2313/0214; F25B 2700/21152; F25B 2313/0315; F25B 2339/047; F25B 2313/0314; F25B 2700/1931
See application file for complete search history.

(56) References Cited

U.S. PATENT DOCUMENTS

2005/0111991 A1* 5/2005 Chida ............... F24D 17/02
417/207
2008/0092568 A1* 4/2008 Ookoshi ............ F24D 17/02
62/151
(Continued)

FOREIGN PATENT DOCUMENTS

JP H07-158998 A 6/1995
JP H08-261599 A 10/1996
(Continued)

OTHER PUBLICATIONS

Office Action dated May 10, 2016 in the corresponding JP Application No. 2014-555407 (with English translation).
(Continued)

Primary Examiner — Emmanuel Duke
(74) Attorney, Agent, or Firm — Posz Law Group, PLC

(57) ABSTRACT

A heat pump system adjusts a degree of subcooling of an indoor-side heat exchanger in a heating priority mode, and adjusts any one of a degree of subcooling of a hot-water supply-side heat exchanger (water-side heat exchanger) and a discharge temperature of a compressor in a hot-water supply priority mode.

20 Claims, 4 Drawing Sheets

(52) U.S. Cl.
CPC .......... *F24D 19/1087* (2013.01); *F25B 13/00* (2013.01); *F25B 29/003* (2013.01); *F25B 2313/0214* (2013.01); *F25B 2313/0314* (2013.01); *F25B 2313/0315* (2013.01); *F25B 2339/047* (2013.01); *F25B 2700/1931* (2013.01); *F25B 2700/21152* (2013.01)

(56) References Cited

U.S. PATENT DOCUMENTS

| | | | | |
|---|---|---|---|---|
| 2011/0289952 | A1* | 12/2011 | Kim | F24D 11/0214 62/189 |
| 2012/0180984 | A1* | 7/2012 | Fujitsuka | F24D 11/0214 165/61 |
| 2012/0291460 | A1* | 11/2012 | Aoyagi | F25B 47/025 62/79 |

FOREIGN PATENT DOCUMENTS

| | | | | |
|---|---|---|---|---|
| JP | 2000-234811 | A | | 8/2000 |
| JP | 2006-105434 | A | | 4/2006 |
| JP | 2009-156520 | A | | 7/2009 |
| JP | 2010-196955 | A | | 9/2010 |
| JP | 2012-067937 | A | | 4/2012 |
| JP | 2012067937 | A | * | 4/2012 .............. F25B 13/00 |
| JP | 2012-097910 | A | | 5/2012 |
| JP | 2012-141113 | A | | 7/2012 |
| WO | WO2011125111 | A1 | * | 10/2011 ............. F24D 17/02 |

OTHER PUBLICATIONS

International Search Report of the International Searching Authority dated Apr. 9, 2013 for the corresponding international application No. PCT/JP2013/050023 (and English translation).

* cited by examiner

HEAT PUMP SYSTEM

CROSS REFERENCE TO RELATED APPLICATION

This application is a U.S. national stage application of International Application No. PCT/JP2013/050023 filed on Jan. 7, 2013, the disclosure of which is incorporated by reference.

TECHNICAL FIELD

The present invention relates to a heat pump system capable of simultaneously performing an indoor-heating operation and a hot-water supply operation, in particular, a heat pump system configured to simultaneously control indoor-heating capacity for an indoor unit and hot-water supply capacity for a hot-water supply unit.

BACKGROUND ART

Hitherto, there exists a heat pump system in which an indoor unit and a hot-water supply unit are connected to a heat source unit by pipes to form a refrigeration cycle so that indoor heating and hot-water supply can be simultaneously operated in a single system. The heat pump system described above enables the heating and the hot-water supply to be implemented by the single system. Therefore, an installation space can be reduced. In addition, because a simultaneous heating and hot-water supply operation can be performed, even if the indoor heating is being performed, a hot-water supply operation can be performed without stopping the heating (see Patent Literatures 1 and 2, for example).

In the related-art heat pump system, however, the heating by the indoor unit and the hot-water supply by the hot-water supply unit are implemented simultaneously. Therefore, capacity of a heat source unit becomes insufficient, and hence there is a possibility of insufficient indoor heating or hot water shortage because of insufficient hot-water supply capacity. Thus, hitherto, an attempt to control distribution between the heat-supply capacity and the indoor-heating capacity has been made by a controlling apparatus.

CITATION LIST

Patent Literature

Patent Literature 1: Japanese Unexamined Patent Application Publication No. 2010-196955 (pp. 14 to 17, FIG. 5, etc.)

Patent Literature 2: Japanese Unexamined Patent Application Publication No. 2006-105434 (pp. 10 and 11, FIG. 1, etc.)

SUMMARY OF INVENTION

Technical Problem

In a heat pump system disclosed in Patent Literature 1, a temperature difference Tx is first calculated by subtracting an indoor air temperature Tr from a target set indoor temperature To. Then, when the temperature difference Tx is equal to or larger than a predetermined value Ta, it is determined that the indoor-heating capacity is required. Therefore, an opening degree of a hot-water supply-side pressure reducing mechanism (first use-side flow rate control valve $42a$) is reduced to ensure the indoor-heating capacity. On the other hand, when the temperature difference Tx is smaller than the predetermined value Ta, it is determined that the indoor-heating capacity is not required. Therefore, an opening degree of a heating-side pressure reducing mechanism (second use-side flow rate control valve $102a$) is reduced to ensure the hot-water supply capacity.

As described above, in the heat pump system of Patent Literature 1, the distribution between the hot-water supply capacity and the indoor-heating capacity is controlled based on the temperature difference Tx. Thus, a possibility that a total sum of operating capacity of the hot-water supply unit and operating capacity of the indoor unit exceeds rated indoor-heating capacity of the heat source unit can be suppressed.

Further, in a heat pump system disclosed in Patent Literature 2, priority is given to the indoor-heating capacity at the start of the operation. Then, when it is determined that an indoor temperature rises so that a heating load starts to be reduced, a heating-side pressure reducing mechanism (heating-side flow rate control valve 26) is controlled to have a valve opening degree that is smaller by one level than that used at the start of the simultaneous operation. On the other hand, a hot-water supply-side pressure reducing mechanism (hot-water storage-side flow rate control valve 27) is controlled to have a valve opening degree that is larger than that used at the start of the simultaneous operation by one level.

As described above, in the heat pump system of Patent Literature 2, the valve opening degree of the heating-side pressure reducing mechanism and the valve opening degree of the hot-water supply-side pressure reducing mechanism are each regulated in accordance with a fluctuation in load on the heating side. In this manner, the distribution can be adjusted so as to transfer capacity of a compressor from an excessive capacity side to an insufficient capacity side. Thus, the capacity is distributed in accordance with each of a heating condition and a hot-water supply condition.

In the heat pump systems of Patent Literature 1 and Patent Literature 2, however, a control operation is performed merely for the capacity distribution without an operation of controlling a refrigerant state. Therefore, if a total opening degree of the heating-side pressure reducing mechanism and the hot-water supply-side pressure reducing mechanism is small, a degree of subcooling of a liquid on the heating side and the hot-water supply side excessively increases. Thus, an operating frequency of a compressor needs to be lowered due to lowered operating efficiency and excessive pressure rise. As a result, a reduction in operating efficiency is brought about.

Further, the opening degree of the heating-side pressure reducing mechanism is reduced so as to ensure the hot-water supply capacity. Therefore, subcooling (SC) on the heating side excessively increases, in particular, when the hot water at high temperature is supplied. As a result, a drop in low-pressure side pressure and a discharge temperature rise due to insufficient refrigerant are brought about. Even in this condition, the operating frequency of the compressor needs to be lowered, leading to the lowered capacity of the heat source unit and the lowered operating efficiency.

In the simultaneous heating and hot-water supply operation, water is boiled simultaneously with indoor temperature control. Thus, heat-source capacity, which is output capacity of the heat source unit, is desired to be increased as much as possible to increase the hot-water supply capacity as much as possible for the purpose of avoiding the hot water shortage. The increase in heat-source capacity enables the hot-water supply capacity to be ensured even when the heating load is large, and is therefore extremely important even from this viewpoint. In order to maximize the heat-source capacity, it is extremely important to appropriately control an operating state even when the simultaneous heating and hot-water supply operation is performed.

During the hot-water supply, however, a water temperature often becomes higher than the indoor temperature (for example, the water temperature of 55 degrees Celsius for the indoor temperature of 20 degrees Celsius), in particular. If the hot-water supply capacity is attempted to be increased in this case, it is difficult to control the refrigerant state on the indoor side and the refrigerant state on the hot-water supply side to a desired state. Therefore, the heat-source capacity cannot be maximized in the related art, resulting in long time required to complete the hot-water supply or insufficient heating to impair indoor comfort.

The present invention has been made to solve the problem described above, and therefore has an object to provide a heat pump system that achieves maximization of heat-source capacity and operating efficiency in every load balance between indoor-heating capacity and hot-water supply capacity.

Solution to Problem

A heat pump system according to one embodiment of the present invention includes a refrigerant circuit including a compressor, an indoor-side heat exchanger, a hot-water supply-side heat exchanger, an indoor-side pressure reducing mechanism, a hot-water supply-side pressure reducing mechanism, and a heat source-side heat exchanger, the refrigerant circuit including a passage connecting the indoor-side heat exchanger and the indoor-side pressure reducing mechanism in series, and a passage connecting the hot-water supply-side heat exchanger and the hot-water supply-side pressure reducing mechanism in series, and being connected in parallel with the passage connecting the indoor-side heat exchanger and the indoor-side pressure reducing mechanism, wherein the heat pump system is configured to operate in, when a heating load for heating air by the indoor-side heat exchanger and a hot-water supply load for heating water by the hot-water supply-side heat exchanger are required simultaneously, a heating priority mode configured to set an opening degree of the indoor-side pressure reducing mechanism to be larger than an opening degree of the hot-water supply-side pressure reducing mechanism, and a hot-water supply priority mode configured to set the opening degree of the hot-water supply-side pressure reducing mechanism to be larger than the opening degree of the indoor-side pressure reducing mechanism, wherein the heating priority mode adjusts a degree of subcooling of the indoor-side heat exchanger, and the hot-water supply priority mode adjusts any one of a degree of subcooling of the hot-water supply-side heat exchanger and a discharge temperature of the compressor.

Advantageous Effects of Invention

The heat pump system according to the one embodiment of the present invention has the heating priority mode or the hot-water supply priority mode. The degree of subcooling of the indoor-side heat exchanger is controlled in the heating priority mode, whereas the degree of subcooling of the hot-water supply-side heat exchanger or the discharge temperature of the compressor is controlled in the hot-water supply priority mode. Therefore, the maximization of the capacity of the heat source unit and the operating efficiency can be realized for every load balance between the indoor-heating capacity and the hot-water supply capacity.

DESCRIPTION OF EMBODIMENTS

Figure 1:
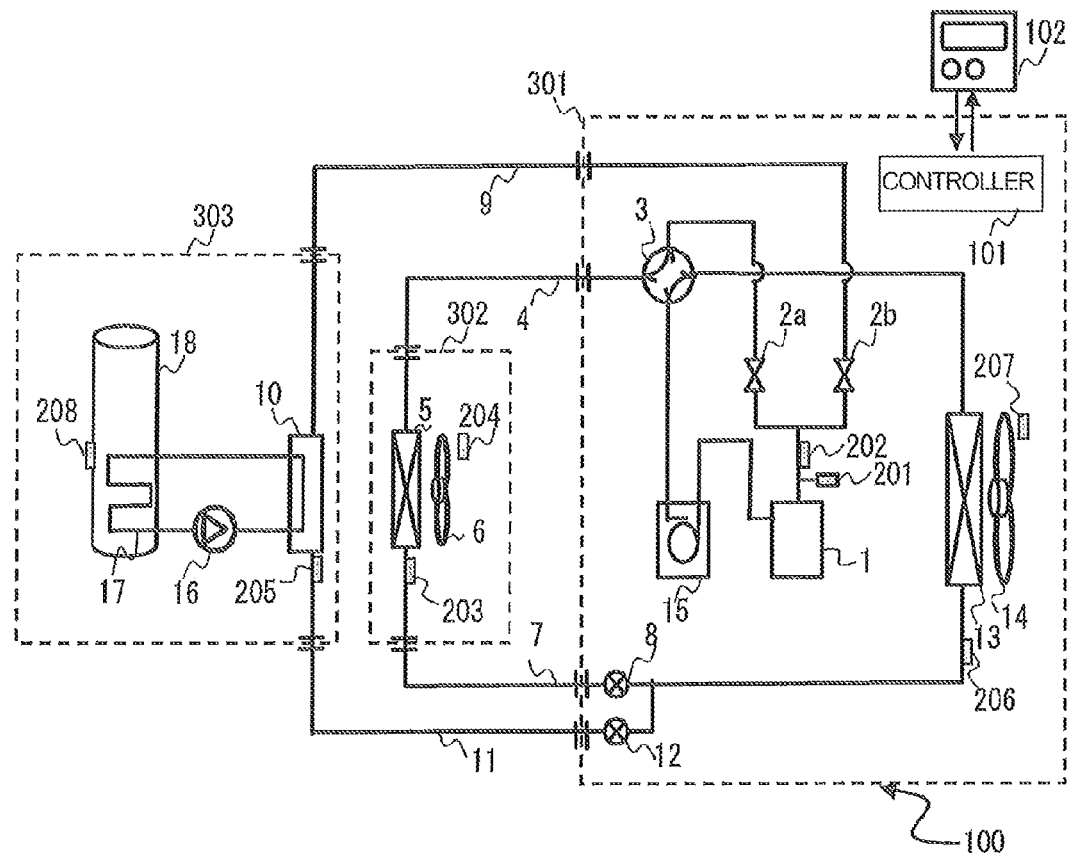
FIG. 1 is a schematic diagram illustrating a refrigerant circuit configuration of a heat pump system according to Embodiment 1 of the present invention.

Now, embodiments of the present invention are described referring to the drawings. In the following drawings including FIG. 1, dimensional relationships between components may differ from actual ones. Further, the components denoted by the same reference signs in the following drawings including FIG. 1 are the same or corresponding ones, which apply in common to the full text of the specification. Further, a form of each of constituent elements described in the full text of the specification is merely an example and is not limited to a description thereof.

Embodiment 1

Figure 2:
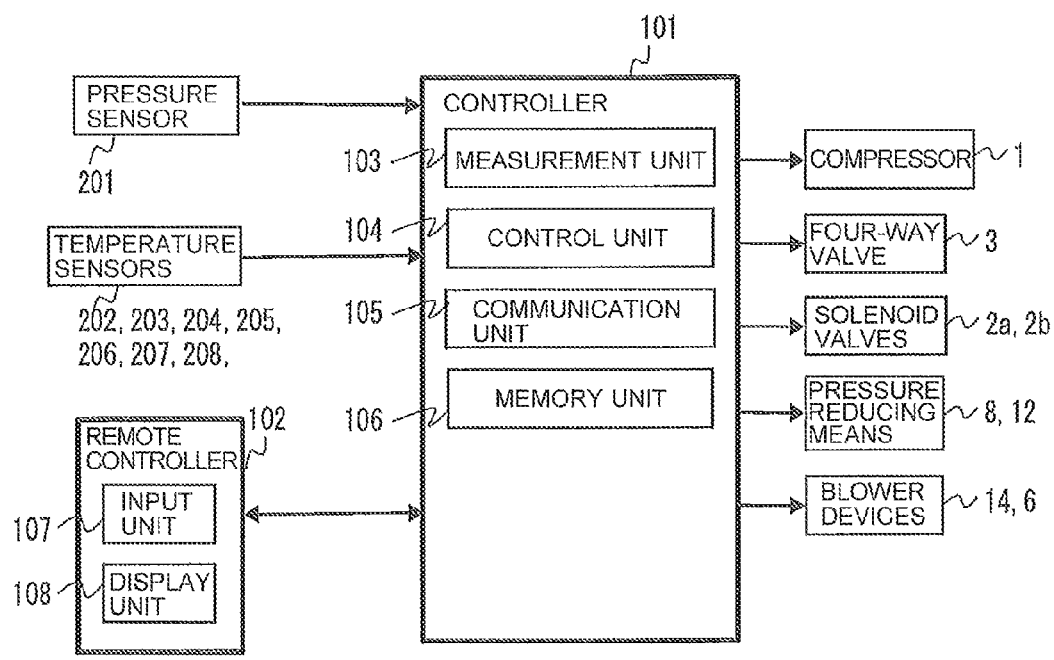
FIG. 2 is a block diagram illustrating an electrical configuration of a controller of the heat pump system according to Embodiment 1 of the present invention.

FIG. 1 is a schematic diagram illustrating a refrigerant circuit configuration of a heat pump system 100 (hereinafter referred to simply as "system 100") according to Embodiment 1 of the present invention. FIG. 2 is a block diagram illustrating an electrical configuration of a controller 101 of the system 100. A configuration of the system 100 is described referring to FIG. 1 and FIG. 2.

The system 100 can simultaneously process a heating command (heating ON/OFF) issued by an indoor unit 302 and a hot-water supply command (hot-water supply ON/OFF) issued by a hot-water supply unit 303 by performing a vapor compression refrigeration-cycle operation. Specifically, the system 100 can simultaneously control indoor-heating capacity for the indoor unit 302 and hot-water supply capacity for the hot-water supply unit 303.

[Apparatus Configuration of System 100]

The system 100 includes a heat source unit 301, the indoor unit 302, and the hot-water supply unit 303. The heat source unit 301 and the indoor unit 302 are connected by an indoor-side gas extension pipe 4 that is a refrigerant pipe and an indoor-side liquid extension pipe 7 that is a refrigerant pipe. The heat source unit 301 and the hot-water supply unit 303 are connected by a water-side gas extension pipe 9 that is a refrigerant pipe and a water-side liquid extension pipe 11 that is a refrigerant pipe.

In Embodiment 1, there is described a case where a single heat source unit 301, a single indoor unit 302, and a single hot-water supply unit 303 are connected, as illustrated in FIG. 1. However, the number of each unit is not particularly limited. For example, the present invention can be similarly carried out even in a case where two or more heat source units 301, two or more indoor units 302, and two or more hot-water supply units 303 are connected. Further, refrigerant to be used in the system 100 is not particularly limited. For example, hydrofluorocarbon (HFC) refrigerant such as R410A, R407C, R404A, and R32, hydrochlorofluorocarbon (HCFC) refrigerant such as R22 and R134a, or natural refrigerant such as hydrocarbon, helium, or carbon dioxide can be used as the refrigerant for the system 100.

(Heat Source Unit 301)

The heat source unit 301 includes a compressor 1, discharge solenoid valves 2a and 2b, a four-way valve 3, an indoor-side pressure reducing mechanism 8, a hot-water supply-side pressure reducing mechanism 12, a heat source-side heat exchanger 13, a heat source-side blower device 14, and an accumulator 15. The compressor 1, the discharge solenoid valves 2a and 2b, the four-way valve 3, the indoor-side pressure reducing mechanism 8, the hot-water supply-side pressure reducing mechanism 12, the heat source-side heat exchanger 13, and the accumulator 15 are connected by pipes to form a part of the refrigerant circuit. However, the four-way valve 3, the heat source-side blower device 14, and the accumulator 15 are not indispensable.

The compressor 1 is of such a type that a rotation speed thereof is controlled by an inverter to enable capacity control, and sucks and compresses the refrigerant to achieve a high-temperature and high-pressure state. A discharge-side pipe connected to the compressor 1 branches in the middle. One is connected to the indoor-side gas extension pipe 4 through the discharge solenoid valve 2a, whereas the other is connected to the water-side gas extension pipe 9 through the discharge solenoid valve 2b.

Each of the discharge solenoid valves 2a and 2b opens and closes a refrigerant passage to control a flow of the refrigerant. The discharge solenoid valve 2a is arranged in the pipe that branches on a discharge side of the compressor 1 to be connected to the indoor-side gas extension pipe 4. The discharge solenoid valve 2b is arranged in the pipe that branches on the discharge side of the compressor 1 to be connected to the water-side gas extension pipe 9.

The four-way valve 3 controls a direction of flow of the refrigerant. The four-way valve 3 is arranged on a downstream side of the discharge solenoid valve 2a. When the direction of the flow of the refrigerant is constant, the four-way valve 3 is not required to be arranged.

The heat source-side heat exchanger 13 is, for example, a cross-fin type fin-and-tube heat exchanger including a heat transfer tube and a large number of fins, which exchanges heat between a heat medium such as outside air and the refrigerant. The heat source-side heat exchanger 13 functions as an evaporator during an indoor-heating operation and functions as a condenser during a cooling operation.

The heat source-side blower device 14 is a centrifugal fan or a multi-blade fan driven by a DC motor (not shown) and is capable of regulating an blowing amount. The heat source-side blower device 14 allows outdoor air to be sucked into the heat source unit 301, allows the outdoor air to exchange heat with the refrigerant in the heat source-side heat exchanger 13, and then exhausts the air outdoors. The heat source-side blower device 14 may be arranged in vicinity of the heat source-side heat exchanger 13. When the heat source-side heat exchanger 13 is not an air-refrigerant heat exchanger, the heat source-side blower device 14 is not required to be arranged.

The indoor-side pressure reducing mechanism 8 reduces a pressure of the refrigerant to expand the refrigerant so as to regulate a flow rate of the refrigerant. The indoor-side pressure reducing mechanism 8 may have a variably controllable opening degree, for example, precise flow rate control means using an electronic expansion valve. The indoor-side pressure reducing mechanism 8 is arranged in the indoor-side liquid expansion pipe 7, which connects the heat source-side heat exchanger 13 and an indoor-side heat exchanger 5.

The hot-water supply-side pressure reducing mechanism 12 reduces the pressure of the refrigerant to expand the refrigerant so as to regulate the flow rate of the refrigerant. The hot-water supply-side pressure reducing mechanism 12 may have a variably controllable opening degree, for example, precise flow rate control means using an electronic expansion valve. The hot-water supply-side pressure reducing mechanism 12 is arranged in the water-side liquid expansion pipe 11 that connects the heat source-side heat exchanger 13 and a water-side heat exchanger 10.

The accumulator 15 is arranged on a suction side of the compressor 1 and has a function of storing liquid refrigerant to prevent the liquid from returning back to the compressor 1 at the time of occurrence of an abnormality in the system 100 or at the time of transient response of the operating state, occurring with a change in the operation control. The accumulator 15 is not indispensable.

The heat source unit 301 includes a pressure sensor 201 and temperature sensors 202, 206, and 207.

The pressure sensor 201 is arranged on the discharge side of the compressor 1 and measures a refrigerant pressure at a location of installation.

The temperature sensor 202 is arranged on the discharge side of the compressor 1 and measures a refrigerant temperature at a location of installation.

The temperature sensor 206 is arranged on a liquid side of the heat source-side heat exchanger 13 and measures the refrigerant temperature at a location of installation.

The temperature sensor 207 is arranged at an air inlet and measures a temperature of outside air to be taken by the heat source-side blower device 14.

The heat source unit 301 further includes the controller 101. Information measured by the sensors included in the heat source unit 301 is transmitted to the controller 101. The controller 101 is described in detail later.

(Indoor Unit 302)

The indoor unit 302 includes the indoor-side heat exchanger 5 and an indoor-side blower device 6.

The indoor-side heat exchanger 5 is, for example, a cross-fin type fin-and-tube heat exchanger including a heat transfer tube and a large number of fins, which exchanges heat between indoor air and the refrigerant. The indoor-side heat exchanger 5 functions as a condenser during the indoor-heating operation and functions as the evaporator during the cooling operation.

The indoor-side blower device 6 is, for example, a centrifugal fan or a multi-blade fan driven by a DC motor (not shown) and is capable of regulating a blowing amount. The indoor-side blower device 6 allows the indoor air to be sucked into the indoor unit 302, allows the indoor air to exchange heat with the refrigerant in the indoor-side heat exchanger 5, and then blows the air (conditioned air) indoors.

The indoor unit 302 includes temperature sensors 203 and 204.

The temperature sensor 203 is arranged on a liquid side of the indoor-side heat exchanger 5 and measures the refrigerant temperature at a location of installation.

The temperature sensor 204 is arranged at an indoor-air inlet side and measures a temperature of indoor air that flows into the indoor unit 302.

Information measured by the sensors included in the heat source unit 302 is transmitted to the controller 101.

(Hot-Water Supply Unit 303)

The hot-water supply unit 303 includes the water-side heat exchanger 10, a water pump 16, a coil heat exchanger 17, and a hot-water storage tank 18. The water pump 16, the water-side heat exchanger 10, and the coil heat exchanger 17 are connected by pipes to form a water-side circuit. Further, by arranging the coil heat exchanger 17 to the hot-water storage tank 18, water stored in the hot-water storage tank 18 is boiled. Further, water that is a heat exchange medium circulates through the water-side circuit as intermediate water.

The water-side heat exchanger 10 is, for example, a plate type water heat exchanger and heats the intermediate water by heat exchange between the intermediate water and the refrigerant. The water-side heat exchanger 10 functions as a condenser during a hot-water supply operation.

The water pump 16 has, for example, a constant rotation speed or a rotation speed variably changed by an inverter and allows the intermediate water to circulate through the water-side circuit.

The coil heat exchanger 17 is arranged in the hot-water storage tank 18 and allows the stored hot water in the hot-water storage tank 18 and the intermediate water circulating through the water-side circuit to exchange heat to heat the stored water so as to provide hot water.

The hot-water storage tank 18 stores the boiled hot water. The hot-water storage tank 18 is of filled-up type. Hot water flows out of an upper part of the tank in accordance with a hot-water tapping request, and the amount of city water at low temperature, which is equal to a tapped amount, is supplied through a lower part of the tank (not shown).

An operating state of the water-side circuit is described.

The intermediate water delivered by the water pump 16 in the hot-water supply unit 303 is heated by the refrigerant in the water-side heat exchanger 10 to have high temperature. Thereafter, the heated high-temperature water flows into the coil heat exchanger 17 included in the hot-water storage tank 18, and heats the stored hot water to have a lowered temperature. Thereafter, the high-temperature water flows out of the coil heat exchanger 17 of the hot-water storage tank 18 to flow to the water pump 16 and is then delivered again to become warm water in the water-side heat exchanger 10. By the process described above, the hot water in the hot-water storage tank 18 is boiled.

A method of heating the water in the hot-water storage tank 18 by the hot-water supply unit 303 is not limited to a heat exchange method using the intermediate water as described in Embodiment 1 and may also be a heating method of controlling such that the water in the hot-water storage tank 18 is caused to directly flow into the pipe to obtain warm water by the heat exchange in the water-side heat exchanger 10 and returning the warm water to the hot-water storage tank 18 again.

The hot-water supply unit 303 includes temperature sensors 205 and 208.

The temperature sensor 205 is arranged on a liquid side of the water-side heat exchanger 10 and measures the refrigerant temperature at a location of installation.

The temperature sensor 208 is arranged on a side surface of the hot-water storage tank 18 and measures a water temperature in the hot-water storage tank 18 at a height of a position of installation.

Information measured by the sensors included in the hot-water supply unit 303 is transmitted to the controller 101.

(Controller 101)

FIG. 2 is an illustration of a state of connection between the controller 101, which controls the system 100, a remote controller 102 to be connected to the controller 101, and the sensors and actuators (such as the compressor 1, the four-way valve 3, the discharge solenoid valves 2a and 2b, the indoor-side pressure reducing mechanism 8, the hot-water supply-side pressure reducing mechanism 12, the heat source-side blower device 14, the indoor-side blower device 6, and the water pump 16). The controller 101 includes a measurement unit 103, a control unit 104, a communication unit 105, and a memory unit 106 therein.

Various amounts detected by the various temperature sensors and the pressure sensor are input to the measurement unit 103 of the controller 101. The information input to the measurement unit 103 is transmitted to the control unit 104.

The control unit 104 controls the compressor 1, the discharge solenoid valves 2a and 2b, the four-way valve 3, the heat source-side blower device 14, the indoor-side pressure reducing mechanism 8, the hot-water supply-side pressure reducing mechanism 12, the indoor-side blower device 6, and the water pump 16 based on the information input to the measurement unit 103.

Communication data information through communication means such as a telephone line, a LAN, or wireless communication is input to the communication unit 105, which performs input and output of information with the remote controller 102.

The memory unit 106 stores predefined constants or preset values transmitted from the remote controller 102. Memory contents stored in the memory unit 106 can be referred to and rewritten as needed.

The measurement unit 103, the control unit 104, and the communication unit 105 are microcomputers, whereas the memory unit 106 is a semiconductor memory or the like. Although the controller 101 is installed in the heat source unit 301, FIG. 1 is an illustration of a mere example of a location of installation. The location at which the controller 101 is installed is not particularly limited. For example, the controller 101 may be installed in the indoor unit 302 or the hot-water supply unit 303, or may be installed at a location different from each of the units.

(Remote Controller 102)

The system 100 includes the remote controller 102, which is a user interface device for allowing the information to be input and output between the system 100 and a user. The remote controller 102 includes an input unit 107 and a display unit 108 therein.

The input unit 107 receives an instruction from the user and, for example, accepts a selection such as cooling ON/OFF, heating ON/OFF, and hot-water supply ON/OFF and receives input of a preset indoor temperature and a preset boiling temperature. Further, when the temperature detected by the temperature sensor 208 installed on the wall side surface of the hot-water storage tank 18 becomes equal to or lower than a predetermined value (for example, equal to or lower than 45 degrees Celsius), the "hot-water supply ON" is automatically input to the input unit 107.

The display unit 108 displays a current operation mode of the system 100 and a priority operation mode for the simultaneous heating and hot-water supply operation.

[Operation Modes of System 100]

<Simultaneous Heating and Hot-Water Supply Operation Mode>

The system 100 can simultaneously process the "heating ON" and the "hot-water supply ON" input through the remote controller 102 and is capable of performing the simultaneous heating and hot-water supply operation. A state of refrigerant flow and control of each apparatus in the simultaneous heating and hot-water supply operation are described below.

In the simultaneous heating and hot-water supply operation mode, the four-way valve 3 connects the discharge side of the compressor 1 to a gas side of the indoor-side heat exchanger 5 and connects a suction side thereof to a gas side of the heat source-side heat exchanger 13. Further, the discharge solenoid valve 2a is open, and the discharge solenoid valve 2b is open.

Gas refrigerant at high temperature and high pressure discharged from the compressor 1 is split into refrigerant flowing to the discharge solenoid valve 2a or the discharge solenoid valve 2b. The refrigerant flowing through the discharge solenoid valve 2a passes through the four-way valve 3 to flow through the indoor-side gas extension pipe 4 and flows into the indoor-side heat exchanger 5. The refrigerant flowing into the indoor-side heat exchanger 5 heats the indoor air supplied by the indoor-side blower device 6 and then flows out of the indoor-side heat exchanger 5. Thereafter, after passing through the indoor-side liquid extension pipe 7 and being subjected to pressure reduction in the indoor-side pressure reducing mechanism 8, the refrigerant joins the refrigerant that has passed through the discharge solenoid valve 2b.

On the other hand, the refrigerant flowing through the discharge solenoid valve 2b passes through the water-side gas extension pipe 9 to flow into the water-side heat exchanger 10. The refrigerant flowing into the water-side heat exchanger 10 heats the intermediate water supplied by the water pump 16. The refrigerant flows out of the water-side heat exchanger 10 to pass through the water-side liquid extension pipe 11 to be subjected to the pressure reduction in the hot-water supply-side pressure reducing mechanism 12 and then joins the refrigerant that has passed through the discharge solenoid valve 2a.

After joining together, the refrigerant flowing through the discharge solenoid valve 2a and the discharge solenoid valve 2b flows into the heat source-side heat exchanger 13. The refrigerant flowing into the heat source-side heat exchanger 13 exchanges heat with the outdoor air supplied by the heat source-side blower device 14 to become low-pressure gas refrigerant. After flowing out of the heat source-side heat exchanger 13, the refrigerant passes through the four-way valve 3 to pass through the accumulator 15. Thereafter, the refrigerant is sucked into the compressor 1 again.

In the system 100, the operating frequency of the compressor is fixed to a maximum value, giving priority to hot-water shortage prevention in a state of "hot-water supply ON". Further, in the system 100, when the operating frequency of the compressor 1 is maximized, a large amount of refrigerant flows into the heat source-side heat exchanger 13. Therefore, the rotation speed of the heat source-side blower device 14 is also fixed to a maximum rotation speed. Further, in the system 100, a rotation speed of the indoor-side blower device 6 is fixed to an instruction value input to the remote controller 102 for the user. Further, in the system 100, a rotation speed of the water pump 16 is fixed to a predetermined rotation speed.

(Heating/Hot-Water Supply Opening-Degree Ratio Control Based on Indoor Temperature)

Next, control on the indoor-side pressure reducing mechanism 8 and the hot-water supply-side pressure reducing mechanism 12 is described. In the system 100, by controlling individual opening degrees of the indoor-side pressure reducing mechanism 8 and the hot-water supply-side pressure reducing mechanism 12 based on a heating load, capacity distribution between indoor-heating capacity and hot-water supply capacity in accordance with the heating load is realized. Specifically, the control is performed as follows.

An indoor temperature Ta is measured for each predetermined time. An indoor-temperature difference dTset (dTset=To−Ta1), which is a temperature difference between a current value Ta1 of the indoor temperature and a preset indoor temperature To, is computed. Further, an indoor temperature change dtTa (Ta1−Ta0), which is a difference between the current value Ta1 of the indoor temperature and a previous value Tao, is computed. The indoor temperature is a temperature detected by the temperature sensor 204. An example where, for example, an indoor-heating/hot-water supply opening-degree ratio, which is an opening-degree ratio of an opening degree of the indoor-side pressure reducing mechanism 8 and an opening degree of the hot-water supply-side pressure reducing mechanism 12 is 5:5 and a pressure reducing mechanism total opening degree is set to 480 p (480 pulses) is described below.

(1) When dTset≥0 and dtTa≥0:

In this case, the indoor temperature is equal to or higher than the preset indoor temperature and has risen. Therefore, the indoor-heating/hot-water supply opening-degree ratio is set to 4:6 so that the opening degree of the indoor-side pressure reducing mechanism 8 is set to 480×4/10=192 p and the hot-water supply-side pressure reducing mechanism 12 is set to 480×6/10=288 p. In this manner, the indoor-heating capacity is reduced, while the hot-water supply capacity is increased.

(2) When dTset≥0 and dtTa<0:

In this case, the indoor temperature is equal to or higher than the preset indoor temperature but has dropped. Therefore, the indoor-heating/hot-water supply opening-degree ratio is left as 5:5.

(3) When dTset<0 and dtTa≥0:

In this case, the indoor temperature is lower than the preset indoor temperature but has risen. Therefore, the indoor-heating/hot-water supply opening-degree ratio is left as 5:5.

(4) When dTset<0 and dtTa<0:

In this case, the indoor temperature is lower than the preset indoor temperature and has dropped. Therefore, the indoor-heating/hot-water supply opening-degree ratio is set to 6:4 so that the opening degree of the indoor-side pressure reducing mechanism 8 is set to 288 p and the hot-water supply-side pressure reducing mechanism 12 is set to 192 p. In this manner, the indoor-heating capacity is increased, while the hot-water supply capacity is reduced.

In the above-mentioned manner, the heating load can be predicted by using the information of the indoor temperature difference and the indoor temperature change to be reflected in the control. In this manner, the heat-source capacity is not excessively unevenly distributed to the heating side or the hot-water supply-side in the system 100. Therefore, appropriate distribution between the indoor-heating capacity and the hot-water supply capacity in accordance with the heating load can be realized.

(Determination of Priority Mode and Pressure Reducing Mechanism Total Opening-Degree Control)

The distribution between the indoor-heating capacity and the hot-water supply capacity can be controlled by the indoor-heating/hot-water supply opening-degree ratio. Only with the above-mentioned control, however, a refrigerant state is not controlled. Therefore, a rise in high pressure or a drop in low-pressure side pressure may be brought about. As a result, there is a possibility that the operating efficiency is lowered. Therefore, in the system 100, a pressure reducing mechanism total opening degree, which is a sum of the opening degree of the indoor-side pressure reducing mechanism 8 and the opening degree of the hot-water supply-side pressure reducing mechanism 12, is controlled depending on an operating state of the refrigerant so that the operating efficiency is maximized. A target operating state realized by controlling the pressure reducing mechanism total opening degree differs depending on which of the hot-water supply capacity and the indoor-heating capacity is desired to be increased. In addition, the determination is made based on the operating state. Optimal control target and target state are selected based on the two factors described above to perform the control. A priority mode is determined and selected to increase any of the hot-water supply capacity and the indoor-heating capacity, which is desired to be increased.

Figure 3:
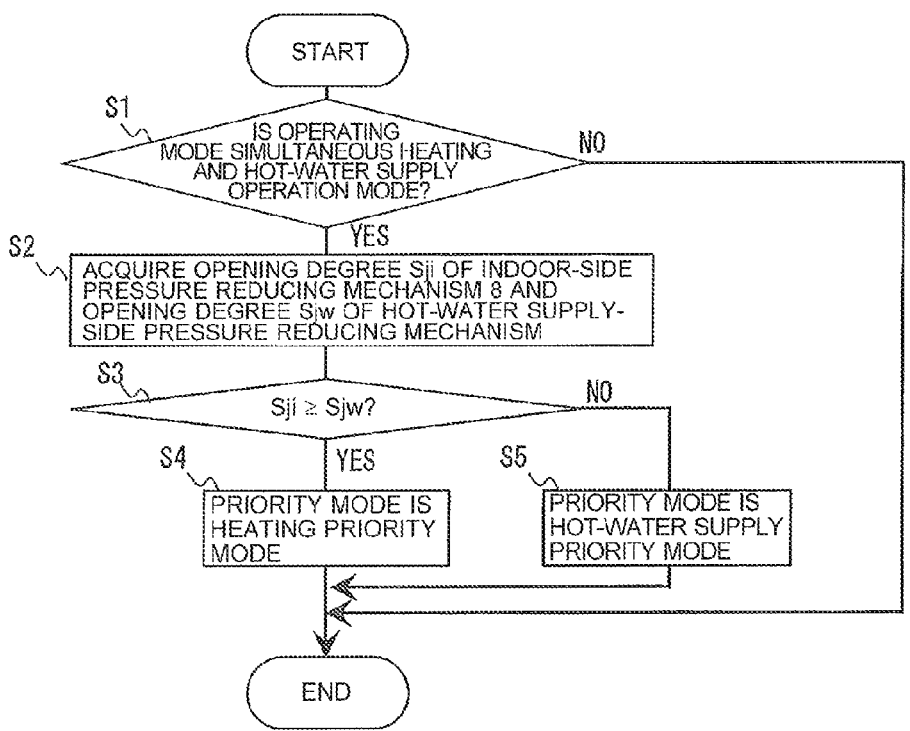
FIG. 3 is a flowchart illustrating a flow of a process of a method of determining a priority mode during a simultaneous heating and hot-water supply operation of the heat pump system according to Embodiment 1 of the present invention.

FIG. 3 is a flowchart illustrating a flow of a process of a method of determining the priority mode during the simultaneous heating and hot-water supply operation performed by the system 100. Referring to FIG. 3, the method of determining the priority mode during the simultaneous heating and hot-water supply operation performed by the system 100 is described. A subject that performs controlling the flowchart of FIG. 3 is the controller 101.

First, in Step S1, it is determined whether or not the operation mode is the simultaneous heating and hot-water supply operation mode. When it is determined that the operation mode is the simultaneous heating and hot-water supply operation mode, an opening degree Sji of the indoor-side pressure reducing mechanism 8 and an opening degree Sjw of the hot-water supply-side pressure reducing mechanism 12 are acquired in Step S2. In Step S3, it is determined whether the opening degree Sji of the indoor-side pressure reducing mechanism 8 is equal to or larger than the opening degree Sjw of the hot-water supply-side pressure reducing mechanism. When it is determined that Sji is equal to or larger than Sjw, it is determined that the heating load is large and therefore the indoor-heating capacity is required to be set equal to or larger than the hot-water supply capacity in this condition. Thus, in Step S4, the priority mode is determined to be a heating priority mode.

On the other hand, when it is determined that Sji is smaller than Sjw, it is determined that the heating load is small and therefore the hot-water supply capacity is required to be set larger than the indoor-heating capacity in this condition. Thus, in Step S5, the priority mode is determined to be a hot-water supply priority mode. The priority mode is determined as described above. Thus, the target operating state can be determined.

Figure 4:
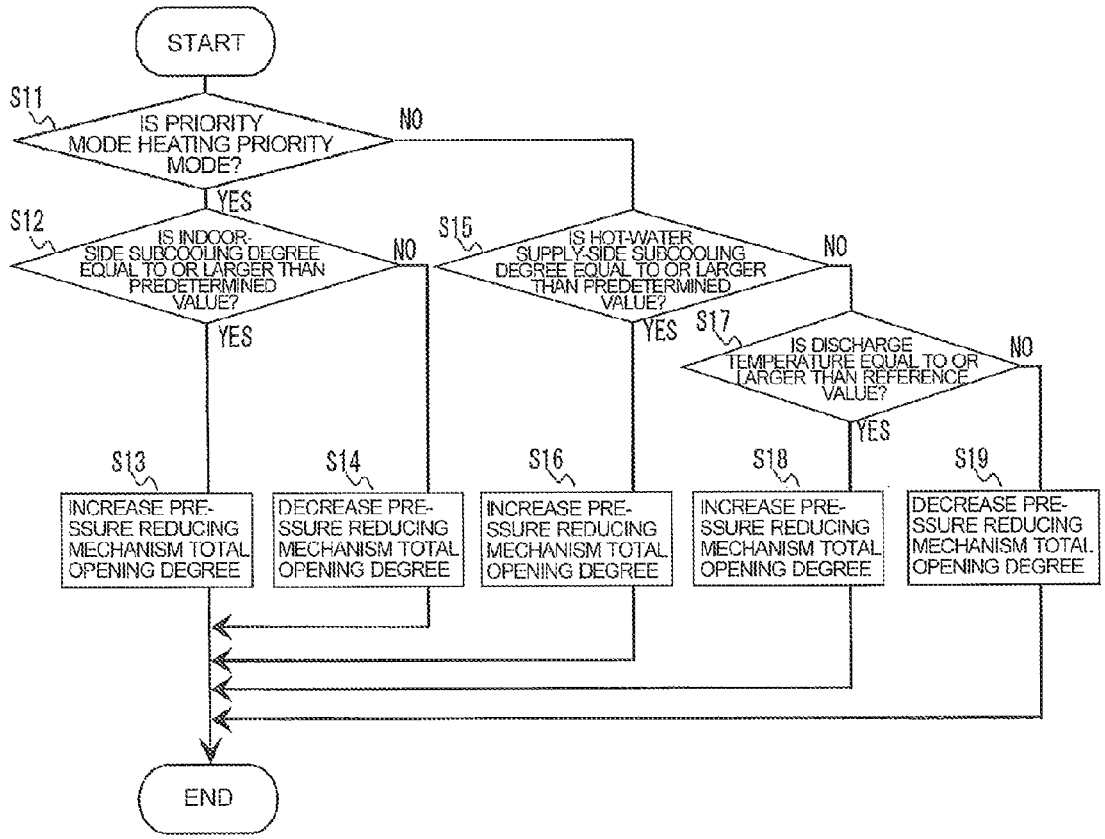
FIG. 4 is a flowchart illustrating a flow of a process of a method of controlling a pressure reducing mechanism total opening degree of the heat pump system according to Embodiment 1 of the present invention.
Figure 5:
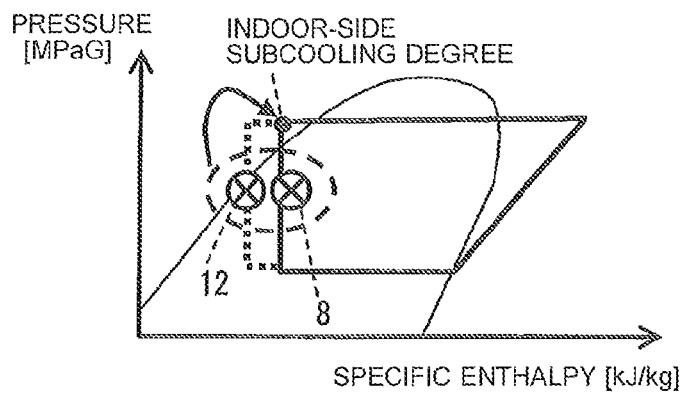
FIG. 5 is a schematic diagram showing an operating state of the heat pump system according to Embodiment 1 of the present invention in a heating priority mode.
Figure 6:
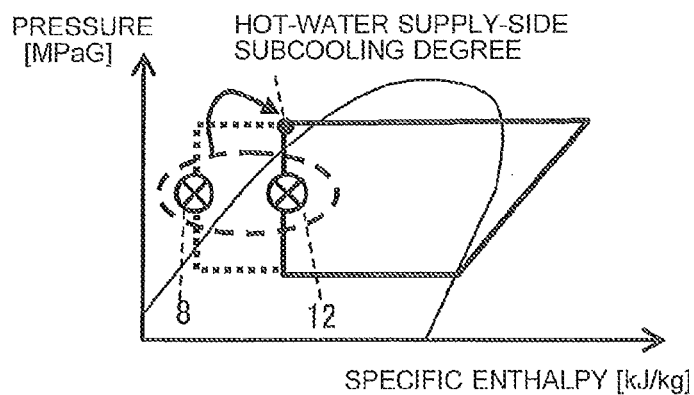
FIG. 6 is a schematic diagram showing the operating state of the heat pump system according to Embodiment 1 of the present invention in a hot-water supply priority mode at low water temperature.
Figure 7:
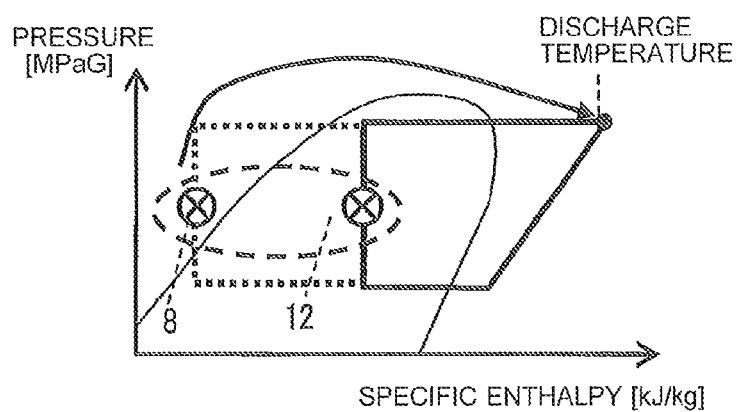
FIG. 7 is a schematic diagram showing the operating state of the heat pump system according to Embodiment 1 of the present invention in the hot-water supply priority mode at high water temperature.

FIG. 4 is a flowchart illustrating a flow of a process of a method of controlling the pressure reducing mechanism total opening degree of the system 100. FIG. 5 is a schematic diagram showing the operating state of the system 100 in the heating priority mode. FIG. 6 is a schematic diagram showing the operating state of the system 100 in the hot-water supply priority mode at low water temperature. FIG. 7 is a schematic diagram showing the operating state of the system 100 in the hot-water supply priority mode at high water temperature. Referring to FIG. 4 to FIG. 7, the method of controlling the pressure reducing mechanism total opening degree is described. A subject that performs controlling the flowchart of FIG. 4 is the controller 101. In FIG. 5 to FIG. 7, a horizontal axis represents a specific enthalpy [kJ/kg], whereas a vertical axis represents a pressure [MPaG].

First, in Step S11, it is determined whether or not the priority mode is the heating priority mode. When it is determined that the priority mode is the heating priority mode, it is determined whether or not an indoor-side subcooling degree is equal to or larger than a predetermined value in Step S12. When it is determined that the indoor-side subcooling degree is equal to or larger than the predetermined value, the pressure reducing mechanism total opening degree is increased in Step S13. On the other hand, when it is determined that the indoor-side subcooling degree is smaller than the predetermined value, the pressure reducing mechanism total opening degree is decreased in Step S14. The indoor-side subcooling degree is obtained by subtracting the temperature detected by the temperature sensor 203 from a saturation temperature at the pressure detected by the pressure sensor 201.

In the heating priority mode, the condition is such that the indoor-heating capacity is desired to be set equal to or larger than the hot-water supply capacity. Therefore, as shown in FIG. 5, the operating state in which the indoor-side subcooling degree is set to a predetermined value (for example, about 10 degrees Celsius) is achieved so as to maximize the performance of the indoor-side heat exchanger 5. In this manner, the hot-water supply capacity can be increased with predetermined indoor-heating capacity. Thus, sufficient hot-water supply capacity can be ensured even under a high heating-load condition.

On the other hand, when it is determined that the priority mode is the hot-water supply priority mode in Step S11, it is determined that a hot-water supply-side subcooling degree is equal to or larger than a predetermined value in Step S15. When the hot-water supply-side subcooling degree is equal to or larger than the predetermined value, the pressure reducing mechanism total opening degree is increased to decrease the hot-water supply-side subcooling degree in Step S16. The hot-water supply-side subcooling degree is obtained by subtracting the temperature detected by the temperature sensor 205 from the saturation temperature at the pressure detected by the pressure sensor 201.

In the hot-water supply priority mode, the condition is such that the hot-water supply capacity is desired to be set equal to or larger than the indoor-heating capacity. Therefore, as shown in FIG. 6, the operating state in which the hot-water supply-side subcooling degree becomes a predetermined value (for example, about 5 degrees Celsius) is achieved so as to maximize the performance of the water-side heat exchanger 10. In this manner, the hot-water supply capacity can be increased. Thus, a boiling speed can be increased under a low water-temperature and low heating-load condition.

When it is determined that the hot-water supply-side subcooling degree is smaller than the predetermined value in Step S15, it is determined whether or not a discharge temperature is equal to or higher than a reference value (reference discharge temperature) in Step S17. The discharge temperature is the temperature detected by the temperature sensor 202.

In the hot-water supply priority mode at high water temperature, the high-pressure-side pressure rises (the refrigerant temperature on a high-pressure side rises) and the opening degree of the indoor-side pressure reducing mechanism 8 is smaller than the opening degree of the hot-water supply-side pressure reducing mechanism 12, and hence the indoor-side subcooling degree increases. Therefore, no excessive liquid refrigerant is left in the accumulator 15. Thus, a suction superheat degree of the compressor 1 increases. Further, a refrigerant circulating amount discharged from the compressor 1 decreases to lower the heat-source capacity. Further, because there is no excessive refrigerant from the accumulator 15 in this case, even if the pressure reducing mechanism total opening degree is reduced, the hot-water supply-side subcooling degree cannot be increased to the predetermined value or larger. Further, the suction superheat degree of the compressor 1 increases, resulting in a rise in discharge temperature.

Therefore, the following operation is implemented in the system 100 so as to determine whether or not there is no excessive liquid refrigerant in the current condition.

Specifically, by using the discharge temperature at the time when the suction superheat degree of the compressor 1 is 5 degrees Celsius as the reference discharge temperature, it is determined whether or not the excessive liquid refrigerant is present in the accumulator 15 based on whether or not the discharge temperature is equal to or higher than the reference discharge temperature. A data table for showing a relationship: TdB=f(Pc, Pe, F) among a reference discharge temperature TdB, a high-pressure-side pressure Pc of the compressor 1, a low-pressure-side pressure Pe thereof, and an operating frequency F of the compressor 1 needs to be stored in the memory unit 106 so as to obtain the reference discharge temperature TdB from the data table. In this case, the high-pressure-side pressure Pc is the pressure detected by the pressure sensor 201, and the low-pressure-side pressure Pe is a pressure obtained by converting the temperature detected by the temperature sensor 206.

The data table is created for the reference discharge temperature of, for example, about 3 degrees Celsius to about 10 degrees Celsius, assuming a small suction superheat degree state. A change in discharge temperature with respect to the operating frequency F of the compressor 1 is not quite large. Therefore, the data table may be created only at a representative operating frequency.

When the discharge temperature is equal to or higher than the reference discharge temperature, it is determined that the current condition is at high water temperature (for example, at an outlet water temperature of about 55 degrees Celsius) and therefore it is difficult to adjust the hot-water supply-side subcooling degree to the predetermined value. Thus, in Step 18, the pressure reducing mechanism total opening degree is increased so as to prevent the discharge temperature from being increased to the predetermined value or higher. In this manner, increases in discharge temperature and suction superheat degree of the compressor 1 can be suppressed. Therefore, a maximum discharge refrigerant flow rate from the compressor 1 can be ensured in accordance with the refrigerant amount sealed in the refrigerant circuit of the system 100. As a result, the hot-water supply capacity can be increased. Thus, under a high water-temperature and low heating-load condition, the boiling speed can be increased.

On the other hand, when the discharge temperature is lower than the reference discharge temperature, it is determined that the water temperature is in a low water-temperature condition and the excessive liquid refrigerant is present in the accumulator 15. Thus, it is determined that the hot-water supply-side subcooling degree can be adjusted to the predetermined value. Thus, in Step S19, the pressure reducing mechanism total opening degree is decreased. In this manner, the hot-water supply capacity can be increased. Thus, the boiling speed can be increased under the low water-temperature and low heating-load condition. In the manner described above, the pressure reducing mechanism total opening degree is controlled.

In the indoor-heating operation mode, the opening degree of the indoor-side pressure reducing mechanism 8 is larger than the opening degree of the hot-water supply-side pressure reducing mechanism 12. Thus, the indoor-side subcooling degree becomes smaller than the hot-water supply-side subcooling degree in many cases.

On the other hand, in the hot-water supply priority mode, the opening degree of the hot-water supply-side pressure reducing mechanism 12 is larger than the opening degree of the indoor-side pressure reducing mechanism 8. Thus, the hot-water supply-side subcooling degree becomes smaller than the indoor-side subcooling degree in many cases.

As described above, the case where the degree of subcooling is controlled approximately corresponds to the condition where the smaller one of the indoor-side subcooling degree and the hot-water supply-side subcooling degree is controlled.

When the pressure reducing mechanism total opening degree is changed, the opening degree is distributed so that a sum of the opening degree of the indoor-side pressure reducing mechanism 8 and the opening degree of the hot-water supply-side pressure reducing mechanism 12 becomes the changed pressure reducing mechanism total opening degree. A distribution method for the opening degree is carried out by the indoor-heating/hot-water supply opening-degree ratio control.

For example, a case where the indoor-heating/hot-water supply opening-degree ratio is 7:3 and the pressure reducing mechanism total opening degree is 480 p before the change and 500 p after the change is described as an example. In this case, the opening degree of the indoor-side pressure reducing mechanism 8 before the change is 336 p (480×7/10), and the opening degree of the hot-water supply-side pressure reducing mechanism 12 before the change is 144 p (480×3/10). The opening degree of the indoor-side pressure reducing mechanism 8 after the change is 500×7/10=350 p, and the opening degree of the hot-water supply-side pressure reducing mechanism 12 after the change is 500×3/10=150 p.

As described above, the pressure reducing mechanism total opening degree after the change is distributed based on the indoor-heating/hot-water supply opening-degree ratio. As a result, the operating state can be controlled to a predetermined value without changing the distribution ratio of the indoor-heating capacity and the hot-water supply capacity. Thus, the heat-source capacity can be maximized.

Now, for example, a case where the indoor-heating/hot-water supply opening-degree ratio is 7:3 and a full opening degree of the indoor-side pressure reducing mechanism 8 and that of the hot-water supply-side pressure reducing mechanism 12 are both 480 p is assumed. Further, a condition where the opening degree of the indoor-side pressure reducing mechanism 8 is 480 p and the opening degree of the hot-water supply-side pressure reducing mechanism 12 is 206 p in the heating priority mode, specifically, a condition where the pressure reducing mechanism total opening degree is 480+206=686 p and the indoor-side subcooling degree is equal to or larger than the predetermined value is assumed. In such a case, the opening degree of the indoor-side pressure reducing mechanism 8 cannot be increased even though the pressure reducing mechanism total opening degree is desired to be increased. Thus, the pressure reducing mechanism total opening degree cannot be distributed in accordance with the indoor-heating/hot-water supply opening-degree ratio.

Further, for example, in a case where the pressure reducing mechanism total opening degree is 700 p, the required opening degree of the indoor-side pressure reducing mechanism 8 is 700×7/10=490 p and therefore cannot be realized. Assuming the case as described above, the system 100 is configured so that the indoor-heating/hot-water supply opening-degree ratio is forcibly changed by the control unit 104 to enable the realization of distribution of the pressure reducing mechanism total opening degree.

For example, the indoor-heating/hot-water supply opening-degree ratio, which is initially set to 7:3, is now set to 6.9:3.1 so that the opening degree of the indoor-side pressure reducing mechanism 8 becomes 480 p and the opening degree of the hot-water supply-side pressure reducing mechanism 12 becomes 220 p. Further, when the opening degree of any one of the indoor-side pressure reducing mechanism 8 and the hot-water supply-side pressure reducing mechanism 12 is a full-closure opening degree, the indoor-heating/hot-water supply opening-degree ratio is changed by a similar process. By changing the indoor-heating/hot-water supply opening-degree ratio as described above, a predetermined refrigerant operating state can be realized. Therefore, a rise in high pressure or a drop in low-pressure side pressure can be avoided, thereby maintaining a large operating efficiency state. Specifically, the control unit 104 can change the indoor-heating/hot-water supply opening-degree ratio so that the pressure reducing mechanism total opening degree can be distributed.

Further, the indoor-heating/hot-water supply opening-degree ratio controls the ratio of the refrigerant flow rate flowing through the indoor-side heat exchanger 5 and the refrigerant flow rate flowing through the water-side heat exchanger 10. A change in refrigerant flow rate is faster than a change in refrigerant operating state (degree of subcooling or discharge temperature). The refrigerant operating state has a slow response because it takes long time to complete changes in refrigerant distributions in the indoor-side heat exchanger 5 and the water-side heat exchanger 10. Therefore, a change interval for the pressure reducing mechanism total opening degree needs to be controlled by the control unit 104 so as to be longer than a change interval for the indoor-heating/hot-water supply opening-degree ratio. In this manner, the refrigerant operating state can be adjusted in a state in which predetermined indoor-heating capacity and hot-water supply capacity are realized. Thus, the control operation is stabilized.

Further, in general, when the indoor temperature becomes higher than the preset indoor temperature by a predetermined value (for example, 1 degree Celsius) or larger, the system turns into an indoor-heating thermostat off state, and in order to prevent the indoor temperature from rising, an operation of closing the indoor-side pressure reducing mechanism 8 to significantly lower the indoor-heating capacity is performed. If the operation is performed frequently, the operating state becomes unstable to lower the operating efficiency. Therefore, when the simultaneous heating and hot-water supply operation is performed by the control unit 104, a temperature difference between the indoor temperature and the preset indoor temperature until the heat pump system is turned into the indoor-heating thermostat off state is increased (for example, to 2 degrees Celsius). In this manner, the number of operations in the indoor-heating thermostat off state can be suppressed, and hence the operating state is stabilized.

Some cases where a reduction in hot-water boiling completion time is more desired than heated indoor temperature control are conceivable. For example, a case where the number of people who take a shower at night suddenly increases is conceivable. Even if the hot-water supply is additionally implemented in such a case, a case where the completion of water boiling is late at night is conceivable if the hot water is supplied at a usual normal speed. Under such a condition, if the hot-water supply priority mode is made selectable by the user through the input unit 107 of the remote controller 102 during the implementation of the simultaneous heating and hot-water supply operation, the simultaneous heating and hot-water supply operation can be maintained in a state in which the hot-water supply capacity is increased. Therefore, the time required to complete the hot-water supply can be shortened. As described above, by making the hot-water supply priority mode selectable depending on the cases, user satisfaction can be improved.

As described above, the heat-source capacity and the operating efficiency can be maximized with a predetermined heating load even every indoor temperature and water temperature condition in the system 100 by controlling the pressure reducing mechanism total opening degree. As a result, avoidance of insufficient indoor heating and early completion of the hot-water supply operation can be realized. In particular, when the hot-water supply capacity is increased under a high water-temperature condition, the indoor-side subcooling degree increases to result in the absence of the excessive liquid refrigerant in the accumulator 15 in some cases. Even in such cases, an excessive rise in discharge temperature can be avoided, and the heat-source capacity can be maximized in accordance with the refrigerant amount sealed in the system.

Specifically, according to the system 100, in addition to the control of each of the pressure reducing mechanism opening degrees by the capacity distribution control, the pressure reducing mechanism total opening degree is controlled depending on a magnitude of the heating load and the operating state. As a result, the maximum heat-source capacity can be achieved. Besides, the predetermined indoor-heating capacity and hot-water supply capacity can be obtained.

For example, hitherto, in a simultaneous operation of a plurality of the indoor units 302, the operating states of all the indoor units 302 are attempted to be controlled in a predetermined state. In the simultaneous hot-water supply and indoor-heating operation, however, the water temperature on the hot-water supply side is significantly low or high in some cases, in contrast to the indoor temperature. Therefore, it is difficult to control both the indoor-side operating state and the hot-water supply-side operating state to the predetermined values while sufficiently ensuring both the hot-water supply capacity and the indoor-heating capacity. Therefore, in the simultaneous hot-water supply and indoor-heating operation, in some cases, the refrigerant remains on any one of the hot-water supply side and the indoor side depending on the capacity desired to be provided with priority or a significantly large amount of the refrigerant remains on the indoor side when the hot water at high temperature is supplied.

Therefore, in the system 100, a target in any one of the states described above is appropriately selected depending on the discharge temperature, thereby realizing an attempted operating state. As a result, a drastic change in high-pressure-side pressure or low-pressure-side pressure can be suppressed. In this manner, the simultaneous hot-water supply and indoor-heating operation, which allows the predetermined hot-water supply capacity and indoor-heating capacity to be ensured, can be implemented.

In Embodiment 1, a case where a capacity of the indoor unit 302 and that of the hot-water supply unit 303 are set the same has been described as an example. However, even when the capacities are different, this technology can be similarly applied. Further, a capacity of the indoor-side pressure reducing mechanism 8 and a capacity of the hot-water supply-side pressure reducing mechanism 12 are set to be the same, but this technology can be similarly applied even when the capacities are different. Even with the apparatus configuration described above, there is no problem because the hot-water supply capacity and the indoor-heating capacity can be controlled to predetermined values by the indoor-heating/hot-water supply opening-degree ratio control.

Further, for a system including a plurality of the indoor units 302 having different capacities and the same number of a plurality of the indoor-side pressure reducing mechanisms 8, the heating-side opening degree determined by the pressure reducing mechanism total opening degree and the indoor-heating/hot-water supply opening-degree ratio needs to be divided for each capacity. For example, a case where the pressure reducing mechanism total opening degree is 480 p and the indoor-heating/hot-water supply opening-degree ratio is 7:3 in a system including one 2HP indoor unit 302 and two 1HP indoor units 302 is assumed. In this case, a total opening degree on the heating side is 336 p. Therefore, the opening degree of the indoor-side pressure reducing mechanism 8 that flows the refrigerant to the 2HP indoor unit 302 is set to 336×2/(1+1+2)=168 p and the opening degree of the indoor-side pressure reducing mechanisms 8 that flow the refrigerant to the 1HP indoor units 302 is set to 336×1/(1+1+2)=84 p. In this manner, this technology becomes applicable.

Embodiment 2

Figure 8:
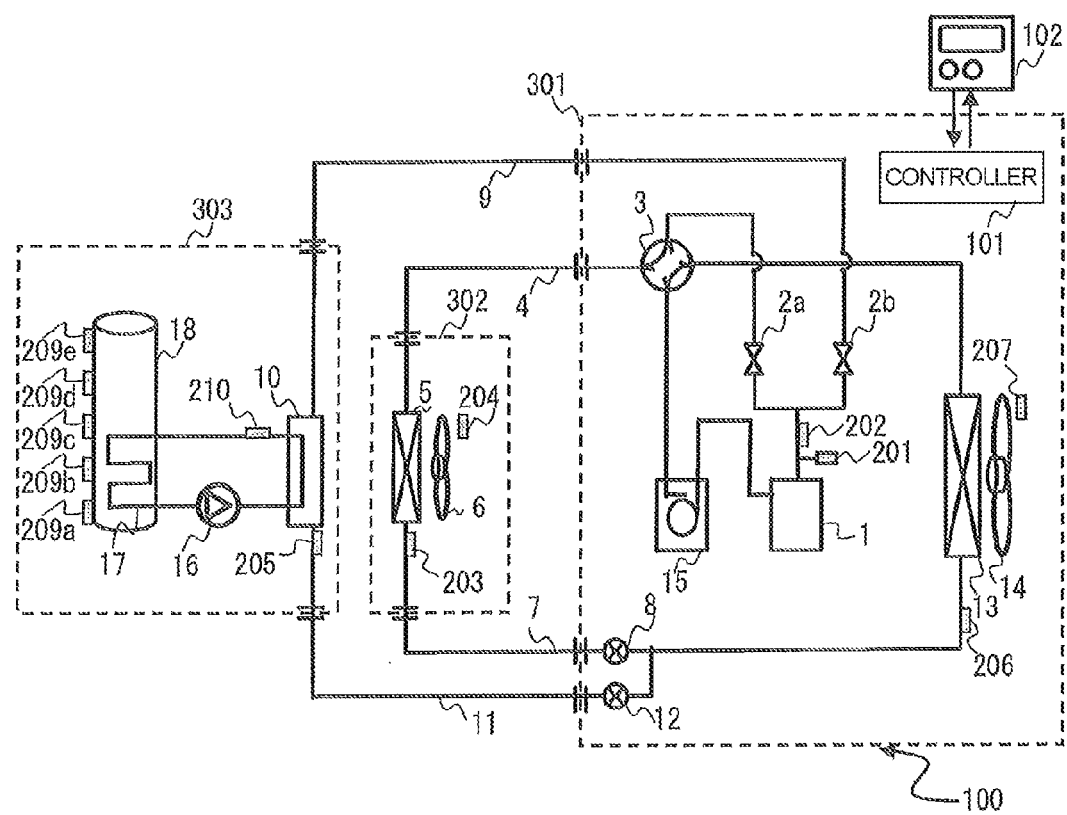
FIG. 8 is a schematic diagram illustrating a refrigerant circuit configuration of a heat pump system according to Embodiment 2 of the present invention.

FIG. 8 is a schematic diagram illustrating a refrigerant circuit configuration of a heat pump system 200 (hereinafter referred to simply as "system 200") according to Embodiment 2 of the present invention. A configuration and operation of the system 200 are described referring to FIG. 8. In Embodiment 2, differences from Embodiment 1 described above are mainly described. Parts having the same functions as those in Embodiment 1 are denoted by the same reference signs, and the description thereof is herein omitted.

Similarly to the system 100 according to Embodiment 1, the system 200 can simultaneously process a heating command (heating ON/OFF) issued by an indoor unit 302 and a hot-water supply command (hot-water supply ON/OFF) issued by a hot-water supply unit 303 by performing a vapor compression refrigeration-cycle operation. Specifically, the system 200 can simultaneously control indoor-heating capacity for the indoor unit 302 and hot-water supply capacity for the hot-water supply unit 303.

A circuit configuration and a basic operation of the system 200 are the same as those of the system 100 according to Embodiment 1. However, the system 200 differs from the system 100 in that five temperature sensors (209a to 209e from the bottom) are installed on the hot-water storage tank 18 in a tank height direction and that a temperature sensor 210 is installed at an outlet of the water-side heat exchanger 10 of the water-side circuit. Further, the system 200 is configured so that a hot-water supply ON time period can be measured by the measurement unit 103. As described above, the system 200 has a configuration in which the hot-water supply load condition such as the acquisition of the water temperature and the measurement of the hot-water supply time period can be acquired in more detail than in Embodiment 1.

In the system 200, the plurality of temperature sensors are additionally installed on the hot-water storage tank 18 in the height direction. Therefore, a tank heat storage quantity can be calculated. The hot-water storage tank 18 is divided at installation positions of the temperature sensors 209a to 209e in the height direction. Based on measurement data of the temperature sensors 209 located at an upper end and a lower end of each of divided sections measured by the measurement unit 103, an average temperature is calculated for each of the divided sections. The temperature measured by the temperature sensor 209a is used as the average temperature for a lowermost section, whereas the temperature measured by the temperature sensor 209e is used as the average temperature for an uppermost section.

A value obtained by subtracting a city water temperature from the average temperature is multiplied by a volume of each of the divided sections and a specific heat of water to estimate a stored hot-water heat quantity of each of the divided sections. The estimated stored hot-water heat quantities of the respective divided sections are integrated. A heat quantity obtained by the integration is determined as a stored hot-water heat quantity in the hot-water storage tank 18. In this case, the volume of each of the divided sections is determined by dividing an internal volume of the hot-water storage tank 18 by the number of the installed temperature sensors 209+1. Further, the temperature of the city water is fixed to, for example, 15 degrees Celsius.

Immediately after the input of the hot-water supply ON command, the above-mentioned calculation is performed to determine the tank heat quantity. The same calculation is performed, assuming that tapping temperatures are detected by all the temperature sensors 209a to 209e. The determined heat storage quantity is also determined as a target tank heat storage quantity. When the tank heat storage quantity is lower than the target tank heat storage quantity by predetermined percentages (for example, 20% or lower), time required to complete the boiling is lengthened. Therefore, the operation mode is forcibly set to the hot-water supply priority mode. Specifically, the opening degree of the indoor-side pressure reducing mechanism 8 is inhibited to become equal to or larger than the opening degree of the hot-water supply-side pressure reducing mechanism 12. Further, even when the hot-water supply time period is equal to or longer than a predetermined time period (for example, 2 hours or longer), the operation mode is forcibly set to the hot-water supply priority mode. In this manner, the time required to complete the hot-water supply can be prevented from being extremely lengthened. Thus, the fear of hot-water shortage is reduced.

In the hot-water supply priority mode, the operation of increasing the hot-water supply capacity to be larger than the indoor-heating capacity is attempted by setting the opening degree of the hot-water supply-side pressure reducing mechanism 12 larger than the opening degree of the indoor-side pressure reducing mechanism 8. However, if a condensing temperature is not equal to or higher than the water temperature even though the opening degree of the hot-water supply-side pressure reducing mechanism 12 is larger than the opening degree of the indoor-side pressure reducing mechanism 8, it means that condensing latent heat of the refrigerant is not used to heat the water. Therefore, the hot-water supply capacity is small in this state. Therefore, the condensing temperature is set equal to or higher than the water temperature of water flowing through the water-side heat exchanger 10. The indoor-heating/hot-water supply opening-degree ratio is controlled by the control unit 104 so that the condensing temperature becomes equal to or higher than the water temperature at which the heat is exchanged in the water-side heat exchanger 10. The condensing temperature is a saturation temperature at the pressure detected by the pressure sensor 201, and the water temperature is the temperature detected by the temperature sensor 210.

In this manner, the condensing latent heat of the refrigerant can be constantly used to heat the water in the hot-water supply priority mode. Therefore, in the system 200, the hot-water supply capacity can be reliably ensured. Thus, the capacity distribution between the indoor-heating capacity and the hot-water supply capacity can be more appropriately adjusted. The temperature sensors are installed on the outlet side of the water-side heat exchanger 10 in Embodiment 2, but the temperature sensors may also be installed on an inlet side of the water-side heat exchanger 10 without being limited thereto.

As described above, the system 200 is configured to be capable of monitoring the hot-water supply load conditions (the temperature sensors 209 and the hot-water supply time period) and the water-temperature information (the temperature sensor 210) during the operation. Thus, in addition to the effects of Embodiment 1, the time required to complete the hot-water supply can be prevented from being extremely lengthened. Thus, the fear of hot-water shortage can be reduced.

REFERENCE SIGNS LIST

1 compressor 2a discharge solenoid valve 2b discharge solenoid valve 3 four-way valve 4 indoor-side gas extension pipe 5 indoor-side heat exchanger 6 indoor-side blower device 7 indoor-side liquid extension pipe 8 indoor-side pressure reducing mechanism 9 water-side gas extension pipe 10 water-side heat exchanger (hot-water-side heat exchanger) 11 water-side liquid extension pipe 12 hot-water supply-side pressure reducing mechanism 13 heat source-side heat exchanger 14 heat source-side blower device 15 accumulator 16 water pump 17 coil heat exchanger 18 hot-water storage tank

100 heat pump system 101 controller 102 remote controller 103 measurement unit 104 control unit 105 communication unit 106 memory unit

107 input unit 108 display unit 200 heat pump system 201 pressure sensor 202 temperature sensor 203 temperature sensor 204 temperature sensor 205 temperature sensor 206 temperature sensor

207 temperature sensor 208 temperature sensor 209 temperature sensor 209a temperature sensor 209b temperature sensor

209c temperature sensor 209d temperature sensor 209e temperature sensor 210 temperature sensor 211 temperature sensor

301 heat source unit 302 indoor unit 303 hot-water supply unit

The invention claimed is:

1. A heat pump system comprising a refrigerant circuit including a compressor, an indoor-side heat exchanger, a hot-water supply-side heat exchanger, an indoor-side pressure reducing mechanism, a hot-water supply-side pressure reducing mechanism, and a heat source-side heat exchanger, the refrigerant circuit including
    a passage connecting the indoor-side heat exchanger and the indoor-side pressure reducing mechanism in series, and
    a passage connecting the hot-water supply-side heat exchanger and the hot-water supply-side pressure reducing mechanism in series, and being connected in parallel with the passage connecting the indoor-side heat exchanger and the indoor-side pressure reducing mechanism,
    wherein the heat pump system is configured to operate in, when a heating load for heating air by the indoor-side heat exchanger and a hot-water supply load for heating water by the hot-water supply-side heat exchanger are required simultaneously,
        a heating priority mode configured to set an opening degree of the indoor-side pressure reducing mechanism to be larger than an opening degree of the hot-water supply-side pressure reducing mechanism, and
        a hot-water supply priority mode configured to set the opening degree of the hot-water supply-side pressure reducing mechanism to be larger than the opening degree of the indoor-side pressure reducing mechanism, wherein
    the heating priority mode adjusts a degree of subcooling of the indoor-side heat exchanger based on the opening degree of the indoor-side pressure reducing mechanism and the opening degree of the hot water supply-side pressure reducing mechanism,
    the hot-water supply priority mode adjusts any one of a degree of subcooling of the hot-water supply-side heat exchanger and a discharge temperature of the compressor based on the opening degree of the indoor-side pressure reducing mechanism and the opening degree of the hot water supply-side pressure reducing mechanism, and
    wherein a ratio of an indoor-heating capacity and a hot-water supply capacity is controlled by an indoor-heating/hot-water supply opening-degree ratio determined by (i) the opening degree of the indoor-side pressure reducing mechanism with respect to a pressure reducing mechanism total opening degree and (ii) the opening degree of the hot-water supply-side pressure reducing mechanism with respect to the pressure reducing mechanism total opening degree, the pressure reducing mechanism total opening degree being a total of (i) the opening degree of the indoor-side pressure reducing mechanism and (ii) the opening degree of the hot-water supply-side pressure reducing mechanism, and
    when the pressure reducing mechanism total opening degree is changed, a change amount of the opening degree of the indoor-side pressure reducing mechanism and a change amount of the opening degree of the hot-water supply-side pressure reducing mechanism are determined by the indoor-heating/hot-water supply opening-degree ratio.

2. The heat pump system of claim 1, wherein, when the degree of subcooling of the hot-water supply-side heat exchanger is smaller than a preset predetermined value and the discharge temperature of the compressor is equal to or larger than a reference value in the hot-water supply priority mode, the discharge temperature of the compressor is controlled.

3. The heat pump system of claim 1, wherein the indoor-heating/hot-water supply opening-degree ratio is determined based on the heating load.

4. The heat pump system of claim 1, wherein the indoor-heating/hot-water supply opening-degree ratio is changed so as not to exceed the pressure reducing mechanism total opening degree.

5. The heat pump system of claim 1, wherein a change interval for changing the pressure reducing mechanism total opening degree is set longer than a change interval for changing the indoor-heating/hot-water supply opening-degree ratio.

6. The heat pump system of claim 1, turning into an indoor-heating thermostat off state when an indoor temperature becomes equal to or higher than a preset indoor temperature by a predetermined value, wherein a temperature difference between the indoor temperature and the preset indoor temperature until the heat pump system turns to an indoor-heating thermostat off state is increased.

7. The heat pump system of claim 1, further comprising a remote controller capable of displaying the heating priority mode or the hot-water supply priority mode so that the heating priority mode or the hot-water supply priority mode is selectively inputtable.

8. The heat pump system of claim 1, further comprising a hot-water storage tank for storing water heated by the hot-water supply-side heat exchanger, wherein
at least one of a hot-water supply time period and a heat storage quantity of the hot-water storage tank is measured, and
when at least one of a condition where the hot-water supply time period is equal to or larger than a predetermined value and a condition where the heat storage quantity of the heat storage tank is equal to or smaller than a predetermined value at start of hot-water supply is satisfied, the hot-water supply priority mode is set as a priority mode.

9. The heat pump system of claim 8, further comprising a plurality of temperature sensors arranged in a height direction of the hot-water storage tank,
wherein the heat storage quantity of the hot-water storage tank is measured based on measurement information by the plurality of temperature sensors.

10. The heat pump system of claim 1, wherein a condensing temperature is set equal to or higher than a water temperature of water flowing through the hot-water supply-side heat exchanger in the hot-water supply priority mode.

11. A heat pump system comprising a refrigerant circuit including a compressor, an indoor-side heat exchanger, a hot-water supply-side heat exchanger, an indoor-side pressure reducing mechanism, a hot-water supply-side pressure reducing mechanism, and a heat source-side heat exchanger,
the refrigerant circuit including
a passage connecting the indoor-side heat exchanger and the indoor-side pressure reducing mechanism in series, and
a passage connecting the hot-water supply-side heat exchanger and the hot-water supply-side pressure reducing mechanism in series, and being connected in parallel with the passage connecting the indoor-side heat exchanger and the indoor-side pressure reducing mechanism,
wherein the heat pump system is configured to operate in, when a heating load for heating air by the indoor-side heat exchanger and a hot-water supply load for heating water by the hot-water supply-side heat exchanger are required simultaneously,
a heating priority mode configured to set an opening degree of the indoor-side pressure reducing mechanism to be larger than an opening degree of the hot-water supply-side pressure reducing mechanism, and
a hot-water supply priority mode configured to set the opening degree of the hot-water supply-side pressure reducing mechanism to be larger than the opening degree of the indoor-side pressure reducing mechanism, wherein
the heating priority mode adjusts a degree of subcooling of the indoor-side heat exchanger based on the opening degree of the indoor-side pressure reducing mechanism and the opening degree of the hot water supply-side pressure reducing mechanism, and
the hot-water supply priority mode adjusts any one of a degree of subcooling of the hot-water supply-side heat exchanger and a discharge temperature of the compressor based on the opening degree of the indoor-side pressure reducing mechanism and the opening degree of the hot water supply-side pressure reducing mechanism, and
wherein a ratio of an indoor-heating capacity and a hot-water supply capacity is controlled by an indoor-heating/hot-water supply opening-degree ratio determined by (i) the opening degree of the indoor-side pressure reducing mechanism with respect to a pressure reducing mechanism total opening degree, and (ii) the opening degree of the hot-water supply-side pressure reducing mechanism with respect to the pressure reducing mechanism total opening degree, the pressure reducing mechanism total opening degree being a total of (i) the opening degree of the indoor-side pressure reducing mechanism and (ii) the opening degree of the hot-water supply-side pressure reducing mechanism; and
the indoor-heating/hot-water supply opening-degree ratio is determined based on the heating load.

12. The heat pump system of claim 11, wherein, when the degree of subcooling of the hot-water supply-side heat exchanger is smaller than a preset predetermined value and the discharge temperature of the compressor is equal to or larger than a reference value in the hot-water supply priority mode, the discharge temperature of the compressor is controlled.

13. The heat pump system of claim 11, wherein the indoor-heating/hot-water supply opening-degree ratio is determined based on the heating load.

14. The heat pump system of claim 11, wherein the indoor-heating/hot-water supply opening-degree ratio is changed so as not to exceed the pressure reducing mechanism total opening degree.

15. The heat pump system of claim 11, wherein a change interval for changing the pressure reducing mechanism total opening degree is set longer than a change interval for changing the indoor-heating/hot-water supply opening-degree ratio.

16. The heat pump system of claim 11, turning into an indoor-heating thermostat off state when an indoor temperature becomes equal to or higher than a preset indoor temperature by a predetermined value, wherein a temperature difference between the indoor temperature and the preset indoor temperature until the heat pump system turns to an indoor-heating thermostat off state is increased.

17. The heat pump system of claim 11, further comprising a remote controller capable of displaying the heating priority mode or the hot-water supply priority mode so that the heating priority mode or the hot-water supply priority mode is selectively inputtable.

18. The heat pump system of claim 11, further comprising a hot-water storage tank for storing water heated by the hot-water supply-side heat exchanger, wherein
   at least one of a hot-water supply time period and a heat storage quantity of the hot-water storage tank is measured, and
   when at least one of a condition where the hot-water supply time period is equal to or larger than a predetermined value and a condition where the heat storage quantity of the heat storage tank is equal to or smaller than a predetermined value at start of hot-water supply is satisfied, the hot-water supply priority mode is set as a priority mode.

19. The heat pump system of claim 18, further comprising a plurality of temperature sensors arranged in a height direction of the hot-water storage tank,
   wherein the heat storage quantity of the hot-water storage tank is measured based on measurement information by the plurality of temperature sensors.

20. The heat pump system of claim 11, wherein a condensing temperature is set equal to or higher than a water temperature of water flowing through the hot-water supply-side heat exchanger in the hot-water supply priority mode.

* * * * *